US010372411B2

(12) United States Patent
Panguluri

(10) Patent No.: US 10,372,411 B2
(45) Date of Patent: *Aug. 6, 2019

(54) AUDIO STREAMING BASED ON IN-AUTOMOBILE DETECTION

(71) Applicant: Gracenote Digital Ventures, LLC, New York, NY (US)

(72) Inventor: Venkatarama Anilkumar Panguluri, Milpitas, CA (US)

(73) Assignee: Gracenote Digital Ventures, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,857

(22) Filed: Dec. 21, 2018

(65) Prior Publication Data

US 2019/0121606 A1 Apr. 25, 2019

Related U.S. Application Data

(63) Continuation of application No. 16/000,446, filed on Jun. 5, 2018, now Pat. No. 10,275,212, which is a
(Continued)

(51) Int. Cl.
*G06F 3/16* (2006.01)
*H04L 29/06* (2006.01)
(Continued)

(52) U.S. Cl.
CPC ............ *G06F 3/165* (2013.01); *G06F 16/639* (2019.01); *G06F 16/686* (2019.01);
(Continued)

(58) Field of Classification Search
CPC ......... G06F 3/165; G06F 3/167; H04L 65/60; H04R 2499/13; H04B 1/082;
(Continued)

(56) References Cited

U.S. PATENT DOCUMENTS 6,345,250 B1 2/2002 Martin
6,351,679 B1 2/2002 Ainslie
(Continued)

FOREIGN PATENT DOCUMENTS

JP 2010130172 6/2010
KR 1020100000249 1/2010
(Continued)

OTHER PUBLICATIONS

Non-Final Office Action dated Jan. 15, 2019, issued in connection with U.S. Appl. No. 15/387,327, filed Dec. 21, 2016, 24 pages.
(Continued)

*Primary Examiner* — Ahmad F. Matar
*Assistant Examiner* — Sabrina Diaz
(74) *Attorney, Agent, or Firm* — McDonnell Boehnen Hulbert & Berghoff LLP

(57) ABSTRACT

An example embodiment may involve determining that a client device (such as a smartphone, tablet, or in-automobile audio device) is in an automobile and that the client device has access to a playlist of audio content. Possibly based on the client device being in the automobile and having access to the playlist of audio content, the client device may request a stream of the audio content. As a consequence of making the request, the client device may receive the stream of the audio content and begin audible playout of the audio content.

20 Claims, 10 Drawing Sheets

Related U.S. Application Data continuation of application No. 15/387,345, filed on Dec. 21, 2016, now Pat. No. 10,019,225.

(51) Int. Cl.
*G06F 16/638* (2019.01)
*G06F 16/68* (2019.01)
*H04L 29/08* (2006.01)

(52) U.S. Cl.
CPC .......... *H04L 65/4084* (2013.01); *H04L 65/60* (2013.01); *H04L 65/608* (2013.01); *H04L 67/12* (2013.01)

(58) Field of Classification Search
CPC ..... B60R 11/0217; B60R 11/02; H04S 1/002; H04S 3/00
USPC .............................................. 381/86, 89, 302
See application file for complete search history.

(56) References Cited

U.S. PATENT DOCUMENTS

| | | | |
|---|---|---|---|
| 6,438,450 B1 | 8/2002 | DiLorenzo | |
| 6,460,036 B1 | 10/2002 | Herz | |
| 6,609,253 B1 | 8/2003 | Swix et al. | |
| 6,721,781 B1 | 4/2004 | Bates et al. | |
| 6,738,972 B1 | 5/2004 | Willard et al. | |
| 6,766,523 B2 | 7/2004 | Herley | |
| 6,938,209 B2 | 8/2005 | Ogawa et al. | |
| 7,006,967 B1 | 2/2006 | Kahn et al. | |
| 7,013,478 B1 | 3/2006 | Hendricks et al. | |
| 7,200,357 B2* | 4/2007 | Janik ...................... | G11B 27/10 455/3.02 |
| 8,036,646 B1 | 10/2011 | Delker et al. | |
| 8,281,344 B1 | 10/2012 | Mathias | |
| 8,364,757 B2 | 1/2013 | Scott | |
| 8,373,768 B2 | 2/2013 | Bill | |
| 8,669,457 B2 | 3/2014 | Ringewald | |
| 8,886,655 B1 | 11/2014 | Nandy | |
| 8,977,374 B1 | 3/2015 | Eck et al. | |
| 8,984,147 B1 | 3/2015 | Kret et al. | |
| 9,002,703 B1 | 4/2015 | Crosley | |
| 9,105,300 B2 | 8/2015 | Resch | |
| 9,143,718 B2 | 9/2015 | Nagorski et al. | |
| 9,213,705 B1 | 12/2015 | Story, Jr. | |
| 9,285,947 B1 | 3/2016 | Story, Jr. | |
| 9,286,942 B1 | 3/2016 | Hayes | |
| 9,355,174 B2 | 5/2016 | Moss et al. | |
| 9,380,383 B2 | 6/2016 | Brenner et al. | |
| 9,431,002 B2 | 8/2016 | Panguluri et al. | |
| 9,454,342 B2 | 9/2016 | Panguluri et al. | |
| 9,665,169 B1 | 5/2017 | Dai et al. | |
| 9,798,509 B2 | 10/2017 | Panguluri et al. | |
| 9,804,816 B2 | 10/2017 | Panguluri et al. | |
| 9,959,343 B2 | 5/2018 | Sharma et al. | |
| 2002/0002032 A1 | 1/2002 | Fleenor | |
| 2002/0091524 A1 | 7/2002 | Guedalia et al. | |
| 2002/0130898 A1 | 9/2002 | Ogawa et al. | |
| 2003/0070182 A1 | 4/2003 | Pierre et al. | |
| 2003/0093784 A1 | 5/2003 | Dimitrova et al. | |
| 2003/0130894 A1 | 7/2003 | Huettner et al. | |
| 2003/0151618 A1 | 8/2003 | Johnson et al. | |
| 2003/0158735 A1 | 8/2003 | Yamada et al. | |
| 2003/0217061 A1 | 11/2003 | Agassi | |
| 2003/0217121 A1 | 11/2003 | Willis | |
| 2003/0236905 A1 | 12/2003 | Choi et al. | |
| 2004/0237759 A1 | 12/2004 | Bill | |
| 2005/0021500 A1 | 1/2005 | Plastina et al. | |
| 2005/0033582 A1 | 2/2005 | Gadd et al. | |
| 2005/0097613 A1 | 5/2005 | Ulate et al. | |
| 2005/0125148 A1 | 6/2005 | Van Buer et al. | |
| 2005/0125232 A1 | 6/2005 | Gadd | |
| 2005/0174889 A1 | 8/2005 | Marcantonio et al. | |
| 2005/0182675 A1 | 8/2005 | Huettner | |
| 2006/0020609 A1 | 1/2006 | LaChapelle et al. | |
| 2006/0085182 A1 | 4/2006 | Eves et al. | |
| 2006/0085814 A1 | 4/2006 | Okamoto et al. | |
| 2006/0092282 A1 | 5/2006 | Herley et al. | |
| 2006/0116965 A1 | 6/2006 | Kudo et al. | |
| 2006/0168507 A1 | 7/2006 | Hansen | |
| 2006/0236847 A1 | 10/2006 | Withop | |
| 2006/0265421 A1 | 11/2006 | Ranasinghe et al. | |
| 2006/0294212 A1 | 12/2006 | Kikkawa et al. | |
| 2007/0016865 A1 | 1/2007 | Johnson et al. | |
| 2007/0022156 A1 | 1/2007 | Grubbs | |
| 2007/0036289 A1 | 2/2007 | Fu et al. | |
| 2007/0050184 A1 | 3/2007 | Drucker | |
| 2007/0078729 A1 | 4/2007 | Brown | |
| 2007/0192613 A1 | 8/2007 | Amoroso et al. | |
| 2007/0198353 A1 | 8/2007 | Behringer et al. | |
| 2007/0294222 A1 | 12/2007 | Laurila et al. | |
| 2008/0028094 A1 | 1/2008 | Kang | |
| 2008/0046948 A1 | 2/2008 | Verosub | |
| 2008/0133525 A1 | 6/2008 | Ott | |
| 2008/0182670 A1 | 7/2008 | Amron | |
| 2008/0189099 A1 | 8/2008 | Friedman et al. | |
| 2008/0190267 A1 | 8/2008 | Rechsteiner et al. | |
| 2008/0195664 A1 | 8/2008 | Maharajh et al. | |
| 2008/0215624 A1 | 9/2008 | Ohashi | |
| 2008/0235589 A1 | 9/2008 | Shaw | |
| 2008/0256129 A1 | 10/2008 | Salinas et al. | |
| 2008/0268772 A1 | 10/2008 | Linnamaki et al. | |
| 2009/0063511 A1 | 3/2009 | Myers et al. | |
| 2009/0099846 A1 | 4/2009 | Pickering | |
| 2009/0125321 A1 | 5/2009 | Charlebois et al. | |
| 2009/0158342 A1 | 6/2009 | Mercer et al. | |
| 2009/0204243 A1 | 8/2009 | Marwaha et al. | |
| 2009/0221248 A1 | 9/2009 | Ellis | |
| 2009/0222531 A1 | 9/2009 | London et al. | |
| 2009/0276064 A1 | 11/2009 | Van Gassel | |
| 2009/0326953 A1 | 12/2009 | Peralta et al. | |
| 2010/0004768 A1 | 1/2010 | Dunning et al. | |
| 2010/0063818 A1 | 3/2010 | Mason et al. | |
| 2010/0069054 A1 | 3/2010 | Labidi et al. | |
| 2010/0070862 A1 | 3/2010 | Partovi | |
| 2010/0082346 A1 | 4/2010 | Rogers et al. | |
| 2010/0095333 A1 | 4/2010 | Kelly | |
| 2010/0114853 A1 | 5/2010 | Fisher et al. | |
| 2010/0129058 A1 | 5/2010 | Koyano | |
| 2010/0241963 A1 | 9/2010 | Kulis et al. | |
| 2010/0251098 A1 | 9/2010 | Rehki et al. | |
| 2010/0268821 A1 | 10/2010 | Pau | |
| 2010/0322413 A1 | 12/2010 | Matsushima et al. | |
| 2011/0022594 A1 | 1/2011 | Takatsuka et al. | |
| 2011/0066941 A1 | 3/2011 | Chipchase | |
| 2011/0112671 A1 | 5/2011 | Weinstein | |
| 2011/0123176 A1 | 5/2011 | Fujiwara et al. | |
| 2011/0167390 A1 | 7/2011 | Reed, Jr. et al. | |
| 2011/0285547 A1* | 11/2011 | Crowe ...................... | C23F 4/00 340/905 |
| 2011/0320443 A1 | 12/2011 | Ray et al. | |
| 2012/0057842 A1 | 3/2012 | Caligor et al. | |
| 2012/0110126 A1 | 5/2012 | Sparks | |
| 2012/0130817 A1 | 5/2012 | Bousaleh et al. | |
| 2012/0159336 A1 | 6/2012 | Norwood | |
| 2012/0185070 A1 | 7/2012 | Hagg et al. | |
| 2012/0203838 A1 | 8/2012 | Zuckerberg | |
| 2012/0240045 A1 | 9/2012 | Bradley et al. | |
| 2012/0245982 A1 | 9/2012 | Daniel | |
| 2012/0253952 A1 | 10/2012 | Rafenomanjato | |
| 2013/0022131 A1 | 1/2013 | Ocon et al. | |
| 2013/0103496 A1 | 4/2013 | Shekar et al. | |
| 2013/0109340 A1 | 5/2013 | Williams | |
| 2013/0198268 A1 | 8/2013 | Hyman | |
| 2013/0216055 A1 | 8/2013 | Wanca | |
| 2013/0231931 A1 | 9/2013 | Kulis et al. | |
| 2013/0253833 A1 | 9/2013 | Tuukkanen | |
| 2013/0297599 A1 | 11/2013 | Henshall | |
| 2013/0302011 A1 | 11/2013 | Nagorski et al. | |
| 2013/0304822 A1 | 11/2013 | Tetreault | |
| 2014/0006559 A1 | 1/2014 | Drapeau et al. | |
| 2014/0074846 A1 | 3/2014 | Moss et al. | |

(56) References Cited

U.S. PATENT DOCUMENTS

| | | | |
|---|---|---|---|
| 2014/0074924 A1* | 3/2014 | Yim | H04N 21/43637 709/204 |
| 2014/0108141 A1 | 4/2014 | Zigler et al. | |
| 2014/0115463 A1 | 4/2014 | Reznor et al. | |
| 2014/0122080 A1 | 5/2014 | Kaszczuk et al. | |
| 2014/0178043 A1 | 6/2014 | Kritt et al. | |
| 2014/0281973 A1 | 9/2014 | Klappert et al. | |
| 2014/0281976 A1 | 9/2014 | Chia et al. | |
| 2014/0282755 A1 | 9/2014 | Alsina et al. | |
| 2014/0366047 A1 | 12/2014 | Thomas et al. | |
| 2015/0062623 A1 | 3/2015 | Yano et al. | |
| 2015/0222680 A1 | 8/2015 | Grover | |
| 2015/0244805 A1 | 8/2015 | Hampiholi et al. | |
| 2015/0254050 A1 | 9/2015 | Panguluri et al. | |
| 2015/0254051 A1 | 9/2015 | Panguluri et al. | |
| 2015/0255055 A1 | 9/2015 | Panguluri | |
| 2015/0255056 A1 | 9/2015 | Panguluri et al. | |
| 2015/0262229 A1 | 9/2015 | Brenner et al. | |
| 2015/0334170 A1 | 11/2015 | Panguluri | |
| 2015/0348532 A1 | 12/2015 | Cameron et al. | |
| 2015/0373138 A1 | 12/2015 | Brenner et al. | |
| 2016/0066004 A1* | 3/2016 | Lieu | H04N 21/2541 725/29 |
| 2016/0066140 A1 | 3/2016 | Gnanasekaran | |
| 2016/0179087 A1 | 6/2016 | Lee | |
| 2016/0328471 A1 | 11/2016 | Goldin et al. | |
| 2016/0373197 A1 | 12/2016 | Brenner et al. | |
| 2016/0373507 A1* | 12/2016 | White | H04L 65/602 |
| 2017/0006128 A1 | 1/2017 | Graham-Cumming et al. | |
| 2017/0041680 A1 | 2/2017 | Lewis et al. | |
| 2017/0075701 A1 | 3/2017 | Ricci et al. | |
| 2017/0115952 A1* | 4/2017 | Gregory | B60R 16/037 |
| 2017/0187862 A1 | 6/2017 | Rahman et al. | |
| 2017/0300293 A1 | 10/2017 | Zhao et al. | |
| 2017/0344336 A1 | 11/2017 | Lotilzadeh | |
| 2018/0096064 A1 | 4/2018 | Lennon et al. | |

FOREIGN PATENT DOCUMENTS

| | | |
|---|---|---|
| KR | 1020110117496 | 10/2011 |
| KR | 1020140014664 | 2/2014 |
| KR | 1020140126556 | 10/2014 |
| WO | 2005/050652 | 6/2005 |
| WO | 2015/134094 | 9/2015 |
| WO | 2015/134097 | 9/2015 |
| WO | 2015/134102 | 9/2015 |
| WO | 2015/134104 | 9/2015 |
| WO | 2015/138601 | 9/2015 |
| WO | 2017/120008 | 7/2017 |
| WO | 2017/120009 | 7/2017 |

OTHER PUBLICATIONS

Final Office Action dated Jan. 8, 2016, issued in connection with U.S. Appl. No. 14/196,908, filed Mar. 4, 2014, 50 pages.
Advisory Action dated Mar. 18, 2016, issued in connection with U.S. Appl. No. 14/196,908, filed Mar. 4, 2014, 3 pages.
Advisory Action dated Apr. 26, 2016, issued in connection with U.S. Appl. No. 14/196,932, filed Mar. 4, 2014, 8 pages.
Advisory Action dated Mar. 28, 2016, issued in connection with U.S. Appl. No. 14/196,774, filed Mar. 4, 2014, 14 pages.
Final Office Action dated Jan. 21, 2016, issued in connection with U.S. Appl. No. 14/196,774, filed Mar. 4, 2014, 20 pages.
Final Office Action dated Feb. 9, 2017, issued in connection with U.S. Appl. No. 14/196,774, filed Mar. 4, 2014, 22 pages.
Harris, Melissa, "Pandora-like news radio app about to launch," Chicago Tribune website (http://articles.chicagotribune.com/2013-12-01/business/ct-biz-1201-confidential-levy-20131201_1_traffic-report-traffic-information-app), Dec. 1, 2013, 4 pages.
International Searching Authority, International Search Report and Written Opinion dated Mar. 17, 2015, issued in connection with International Patent Application No. PCT/US2014/072829, filed on Dec. 30, 2014, 12 pages.
International Searching Authority, International Search Report and Written Opinion dated Mar. 25, 2015, issued in connection with International Patent Application No. PCT/US2014/072111, filed on Dec. 23, 2014, 12 pages.
International Searching Authority, International Search Report and Written Opinion dated Mar. 31, 2015, issued in connection with International Patent Application No. PCT/US2014/072812, filed on Dec. 30, 2014, 13 pages.
International Searhcing Authority, International Search Report and Written Opinion dated Mar. 18, 2015, issued in connection with International Application No. PCT/US2014/072652, filed on Dec. 30, 2014, 12 pages.
International Searhcing Authority, International Search Report and Written Opinion dated Apr. 22, 2015, issued in connection with International Application No. PCT/US2014/072653, filed on Dec. 30, 2014, 11 pages.
International Searching Authority, International Search Report and Written Opinion dated Mar. 17, 2017, issued in connection with International Patent Application No. PCT/US2016/066961, filed on Dec. 15, 2016, 15 pages.
Non-Final Office Action dated Feb. 1, 2016, issued in connection with U.S. Appl. No. 14/196,870, filed Mar. 4, 2014, 14 pages.
Non-Final Office Action dated Sep. 3, 2015, issued in connection with U.S. Appl. No. 14/196,908, filed Mar. 4, 2014, 41 pages.
Non-Final Office Action dated Oct. 5, 2016, issued in connection with U.S. Appl. No. 14/196,932, filed Mar. 4, 2014, 22 pages.
Non-Final Office Action dated Jul. 16, 2015, issued in connection with U.S. Appl. No. 14/196,932, filed Mar. 4, 2014, 18 pages.
Non-Final Office Action dated Apr. 20, 2017, issued in connection with U.S. Appl. No. 15/244,561, filed Aug. 23, 2016, 7 pages.
Non-Final Office Action dated Jun. 23, 2016, issued in connection with U.S. Appl. No. 14/196,774, filed Mar. 4, 2014, 18 pages.
Non-Final Office Action dated Aug. 25, 2015, issued in connection with U.S. Appl. No. 14/196,774, filed Mar. 4, 2014, 19 pages.
Notice of Allowance dated Aug. 15, 2016, issued in connection with U.S. Appl. No. 14/196,870, filed Mar. 4, 2014, 5 pages.
Notice of Allowance dated Jul. 19, 2016, issued in connection with U.S. Appl. No. 14/196,908, filed Mar. 4, 2014, 11 pages.
Non-Final Office Action dated Sep. 11, 2017, issued in connection with U.S. Appl. No. 15/043,073, filed Feb. 12, 2016, 24 pages.
Printout of website relating to "Rivet News Radio" app, printed Mar. 4, 2014, 2 pages.
Printout of website relating to "Stitcher Radio for Podcasts" app, printed Mar. 4, 2014, 4 pages.
Printout of website relating to "Swell FAQs", printed Mar. 4, 2014, 6 pages.
Printout of website relating to "Swell Radio for News and Podcasts" app, printed Mar. 4, 2014, 3 pages.
Supplemental Notice of Allowability dated Jul. 27, 2016, issued in connection with U.S. Appl. No. 14/196,908, filed Mar. 4, 2014, 6 pages.
International Searching Authority, International Search Report and Written Opinion dated Apr. 10, 2017, issued in connection with International Application No. PCT/US2016/066943, filed on Dec. 15, 2016, 12 pages.
Advisory Action dated Apr. 18, 2017, issued in connection with U.S. Appl. No. 14/196,774, filed Mar. 4, 2014, 4 pages.
Canadian Intellectual Property Office, Office Action dated Apr. 20, 2017, issued in connection with Canadian Application No. 2939311, 4 pages.
Notice of Allowance dated May 11, 2017, issued in connection with U.S. Appl. No. 14/196,932, filed Mar. 4, 2014, 7 pages.
Non-Final Office Action dated May 17, 2017, issued in connection with U.S. Appl. No. 15/223,278, filed Jul. 29, 2016, 32 pages.
Advisory Action dated Dec. 29, 2017, issued in connection with U.S. Appl. No. 15/223,278, filed Jul. 29, 2016, 3 pages.
Non-Final Office Action dated Jan. 31, 2018, issued in connection with U.S. Appl. No. 15/223,278, filed Jul. 29, 2016, 30 pages.
Non-Final Office Action dated Mar. 14, 2018, issued in connection with U.S. Appl. No. 15/387,345, filed Dec. 21, 2016, 15 pages.
Final Office Action dated Oct. 25, 2017, issued in connection with U.S. Appl. No. 15/223,278, filed Jul. 29, 2016, 33 pages.

(56) References Cited

OTHER PUBLICATIONS

Non-Final Office Action dated Oct. 31, 2017, issued in connection with U.S. Appl. No. 15/043,085, filed Feb. 12, 2016, 13 pages.
Australian Government, IP Australia, Examination Report No. 1 dated Aug. 21, 2017, issued in connection with Australian Application No. 2014385236, 3 pages.
Australian Government, IP Australia, Examination Report No. 1 dated May 25, 2017, issued in connection with Australian Application No. 2014385186, 2 pages.
Australian Government, IP Australia, Notice of Acceptance for Patent Application dated May 23, 2017, Issued in connection with Australian Application No. 2014385233, 3 pages.
Australian Government, IP Australia, Examination Report No. 1 dated Feb. 17, 2017, issued in connection with Australian Application No. 2014385233, 4 pages.
Canadian Intellectual Property Office, Office Action dated Oct. 23, 2017, issued in connection with Canadian Application No. 2940394, 4 pages.
Corrected Notice of Allowability dated Sep. 20, 2017, issued in connection with U.S. Appl. No. 14/196,932, filed Mar. 4, 2014, 2 pages.
Corrected Notice of Allowability dated Sep. 22, 2017, issued in connection with U.S. Appl. No. 15/244561, filed Aug. 23, 2016, 2 pages.
European Patent Office, Extended European Search Report dated Nov. 3, 2017, issued in European Application No. 14884480, 10 pages.
European Patent Office, Extended European Search Report dated Oct. 30, 2017, issued in European Application No. 14884638, 9 pages.
Final Office Action dated Jan. 29, 2016, issued in connection with U.S. Appl. No. 14/196,932, filed Mar. 4, 2014, 20 pages.
Notice of Allowance dated Aug. 31, 2017, issued in connection with U.S. Appl. No. 15/244,561, filed Aug. 23, 2016, 5 pages.
European Patent Office, Supplementary European Search Report dated Jul. 13, 2017, issued in European Application No. 14884483, 11 pages.

Non-Final Office Action dated Jan. 22, 2019, issued in connection with U.S. Appl. No. 15/387,351, filed Dec. 21, 2016, 27 pages.
Notice of Allowance dated Feb. 1, 2019, issued in connection with U.S. Appl. No. 16/002,454, filed Jun. 7, 2018, 10 pages.
International Bureau of WIPO, International Preliminary Report on Patentability dated Sep. 15, 2016, issued in connection with International Application No. PCT/US2014/072829, 9 pages.
International Bureau of WIPO, International Preliminary Report on Patentability dated Sep. 15, 2016, issued in connection with International Application No. PCT/US2014/072111, 9 pages.
International Bureau of WIPO, International Preliminary Report on Patentability dated Sep. 15, 2016, issued in connection with International Application No. PCT/US2014/072812, 10 pages.
International Bureau of WIPO, International Preliminary Report on Patentability dated Sep. 15, 2016, issued in connection with International Application No. PCT/US2014/072652, 8 pages.
Australian Government, IP Australia, Notice of Acceptance for Patent Application dated Dec. 14, 2017, issued in connection with Australian Application No. 2014385236, 3 pages.
Final Office Action dated Jun. 5, 2018, issued in connection with U.S. Appl. No. 15/223,278, filed Jul. 29, 2016, 22 pages.
Final Office Action dated Apr. 20, 2018, issued in connection with U.S. Appl. No. 15/043,073, filed Feb. 12, 2016, 27 pages.
Non-Final Office Action dated Apr. 3, 2018, issued in connection with U.S. Appl. No. 15/043,059, filed Feb. 12, 2016, 28 pages.
Notice of Allowance dated Mar. 22, 2018, issued in connection with U.S. Appl. No. 15/043,085, filed Feb. 12, 2016, 9 pages.
Notice of Allowance dated May 31, 2018, issued in connection with U.S. Appl. No. 15/387,345, filed Dec. 21, 2016, 10 pages.
Australian Government, IP Australia, Notice of Acceptance for Patent Application dated Aug. 10, 2017, issued in connection with Australian Application No. 2014385186, 3 pages.
Non-Final Office Action dated Aug. 3, 2018, issued in connection with for U.S. Appl. No. 15/043,073, filed Feb. 12, 2016, pp. 1-27.
Non-Final Office Action dated Dec. 23, 2016, issued in connection with U.S. Appl. No. 14/281356, filed May 19, 2014, 18 pages.
Panguluri, Venkatarama Anilkumar, U.S. Appl. No. 14/281,356, filed May 19, 2014, 45 pages.

* cited by examiner

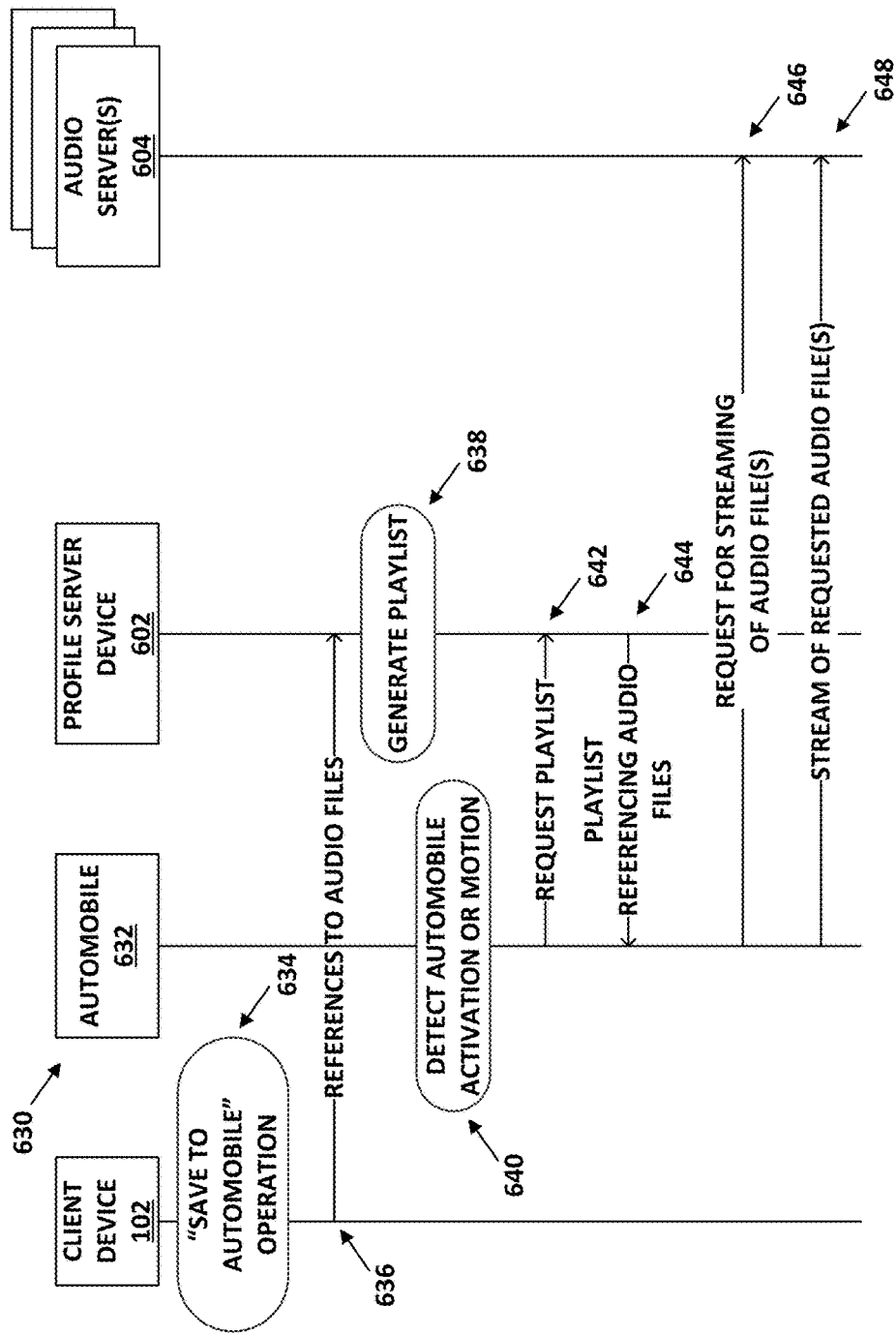

AUDIO STREAMING BASED ON IN-AUTOMOBILE DETECTION

CROSS-REFERENCE TO RELATED APPLICATIONS

This application is a continuation of and claims priority to U.S. patent application Ser. No. 16/000,446, filed Jun. 5, 2018, which is hereby incorporated by reference in its entirety. U.S. patent application Ser. No. 16/000,446 is a continuation of and claims priority to U.S. Pat. No. 10,019,225, filed Dec. 21, 2016, which is hereby incorporated by reference in its entirety.

BACKGROUND

Streaming audio over a packet-switched network, such as the Internet, typically involves a client device receiving a portion of the audio, buffering that portion for playout, and playing out the buffered portion while receiving another portion of the audio. Streaming is typically triggered by a user, for instance, when the user selects particular audio content and instructs an application to begin streaming the selected content. Doing so, however, requires the user's attention, and does not account for environments in which the user desires to listen to the audio, but cannot easily perform the selection thereof.

SUMMARY

The embodiments herein disclose various mechanisms for streaming audio content to client devices that are in automobiles. In order to facilitate the audio streaming, a user may select one or more streaming audio sources using a "save to automobile" function of the client device. These sources may be, for instance, audio files, links to audio files, web pages containing links to audio files, live streaming feeds, and so on. The selected audio sources may be compiled into a playlist by the client device or a server device. Regardless of where it is generated, the playlist may be stored on the client device, a server device, or both.

In one variation, the client device is a wireless communication device, such as a smartphone or tablet, capable of detecting that it is in an automobile. When the client device detects that it is in an automobile, the client device may, based on the playlist, automatically begin streaming audio from the selected audio sources. In another variation, the client device is an automobile that includes an in-automobile audio system. The in-automobile audio system may detect that the automobile is activated, occupied, and/or in motion, download the playlist, and use the playlist to automatically begin streaming audio from the selected audio sources.

Both of these variations allow the user to avoid having to instruct a device to select and stream specific audio content while the user is driving. As a result, the user is able to drive an automobile without this distraction, but still listen to the audio content desired.

Accordingly, a first example embodiment may involve determining that a client device (such as a smartphone, tablet, or in-automobile audio device) is in an automobile, and that the client device has access to a playlist of audio content. Possibly based on the client device being in the automobile and having access to the playlist of audio content, the client device may request a stream of the audio content. As a consequence of making the request, the client device may receive the stream of the audio content.

In a second example embodiment, an article of manufacture may include a non-transitory computer-readable medium, having stored thereon program instructions that, upon execution by a computing device, cause the computing device to perform operations in accordance with the first example embodiment.

In a third example embodiment, a computing device may include at least one processor, as well as memory and program instructions. The program instructions may be stored in the memory, and upon execution by the at least one processor, cause the computing device to perform operations in accordance with the first example embodiment.

In a fourth example embodiment, a system may include various means for carrying out each of the operations of the first example embodiment.

Although examples described herein attribute certain acts to certain devices, any device or devices could perform those acts. For instance, some of the acts attributed to a "client device" above could be performed by one or more different client devices and/or a server device.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B is a message flow diagram depicting streaming of selected audio files to an in-automobile audio system, according to an example embodiment.

DETAILED DESCRIPTION

Figure 1:
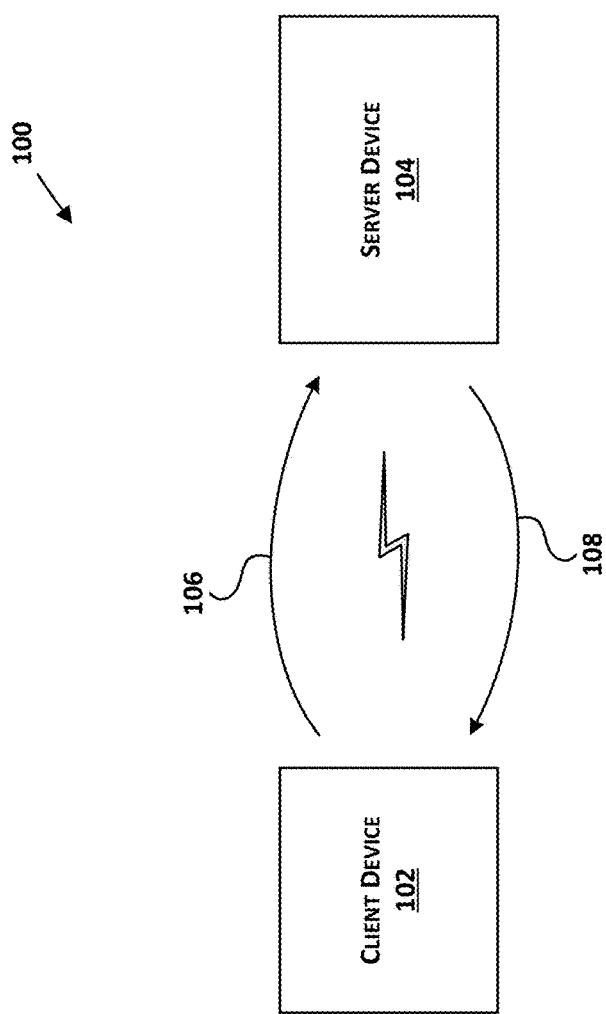
FIG. 1 is a high-level depiction of a client-server computing system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations. For instance, steps, blocks, or acts assigned to a particular device (e.g., a server device) may be carried out by components of another device (e.g., a client device) in alternative embodiments.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purpose of clarity. Thus, such enumeration should not be interpreted to require or imply that these elements, blocks, or steps adhere to a particular arrangement or are carried out in a particular order.

1. Overview

As noted above, the embodiments herein provide for streaming of audio files to client devices in an automobile. In some of these scenarios, the automobile may be in motion and the client device may detect the motion, then automatically request and play out one or more streamed audio files. These embodiments require computer implementation and are non-analogous to pre-Internet audio distribution techniques.

Notably, unlike traditional broadcast audio, online (e.g., Internet-based) audio may be based on a playlist that can be personalized for an individual user and/or client device. For instance, based on user input, a server device may generate a playlist containing a sequence of references (e.g., uniform resource locators, or URLs) to one or more remote audio files. Such a playlist may be transmitted to the client device. The client device may traverse the playlist, retrieving and playing out the audio files. In doing so, the client device may either download one or more of the audio files (from the server device or a different device) prior to playing them out, or may receive the audio files as a stream.

Herein, a download of an audio file may refer to a client device obtaining the entire audio file from a server device before beginning to play out any part of the audio file. The streaming of an audio file, on the other hand, may involve the client device receiving one portion of the audio file while simultaneously playing out another, previously-received, portion of the audio file. While the embodiments herein are generally directed to streaming of audio files, they may be used for the download and subsequent playout of audio files as well.

As an example of streaming, the server device may transmit the playlist to the client device, and the client device may traverse the entries of the playlist. In doing so, the client device may retrieve data representing each referenced audio file, and play out the audio files in accordance with the sequence defined by the playlist. Thus, for each reference in the sequence defined by the playlist, (i) the client device may transmit, to the server device (or a different device), a request for the referenced audio file, (ii) the server device may receive the transmitted request, (iii) responsive to the server device receiving the transmitted request, the server device may transmit to the client, a stream of the requested audio file, (iv) the client device may begin receiving and buffering the stream of the audio file, and (v) while still receiving the stream of the audio file, the client device may play out the received portion of the audio file. In this way, a user may be provided with a substantially continuous playout of the audio files referenced by the playlist.

As a result of the personalization and streaming, the embodiments herein require computers and computer networks. Traditional broadcasting and newscasting systems were unable to support individual user selection of content, and operated using different technology. For instance, these traditional systems generally involve over-the-air analog broadcasting in strict real time. The embodiments herein involve on-demand transmission of a digital stream over a packet-switched network (such as the Internet) to client devices. The client devices can accommodate for jitter (delay variance) in the delivery of stream through the use of buffering.

In some embodiments, the user may select text-based files instead of audio files. These selections may be provided to an automated text-to-speech (TTS) system that converts the text therein into audio. Alternatively, the selections may be provided to a recording studio for a verbal reading of the text into audio. The resulting audio files may be stored and eventually streamed to client devices.

Streaming of audio files is advantageous to users in times at which they operate their devices in a hands-free mode. For example, if a user spends one hour driving to and from work most days, the user may wish to listen to previously-selected audio files during this time.

Regardless of how they may be implemented, the embodiments herein may make use of one or more computing devices. These computing devices may include, for example, client devices under the control of users, and server devices that directly or indirectly interact with the client devices. Such devices are described in the following section.

2. Example Computing Devices, Computing Environments, and Playout Arrangements FIG. 1 illustrates an example communication system 100 for carrying out one or more of the embodiments described herein. Communication system 100 may include computing devices. Herein, a "computing device" may refer to either a client device, a server device (e.g., a stand-alone server computer or networked cluster of server equipment), or some other type of computational platform.

Client device 102 may be any type of device including a personal computer, laptop computer, a wearable computing device, a wireless computing device, a head-mountable computing device, a mobile telephone, or tablet computing device, etc., that is configured to transmit data 106 to and/or receive data 108 from a server device 104 in accordance with the embodiments described herein. For example, in FIG. 1, client device 102 may communicate with server device 104 via one or more wireline or wireless interfaces. In some cases, client device 102 and server device 104 may communicate with one another via a local-area network. Alternatively, client device 102 and server device 104 may each reside within a different network, and may communicate via a wide-area network, such as the Internet.

Client device 102 may include a user interface, a communication interface, a main processor, and data storage (e.g., memory). The data storage may contain instructions executable by the main processor for carrying out one or more operations, such as operations relating to the data sent to, or received from, server device 104, and/or other operations disclosed herein. The user interface of client device 102 may include buttons, a touchscreen, a microphone, and/or any other elements for receiving inputs, as well as a speaker, one or more displays, and/or any other elements for communicating outputs.

Server device 104 may be any entity or computing device arranged to carry out the server operations described herein. Further, server device 104 may be configured to send data 108 to and/or receive data 106 from the client device 102.

Data 106 and data 108 may take various forms. For example, data 106 and 108 may represent packets transmitted by client device 102 or server device 104, respectively, as part of one or more communication sessions. Such a communication session may include packets transmitted on a signaling plane (e.g., session setup, management, and teardown messages), and/or packets transmitted on a media plane (e.g., text, graphics, audio, and/or video data). For instance, data 106 may include transmissions of requests for playlists and audio file streams, while data 108 may include, in response to these requests, transmissions of playlists and audio file streams, respectively.

Regardless of the exact architecture, the operations of client device 102, server device 104, as well as any other operation associated with the architecture of FIG. 1, can be carried out by one or more computing devices. These computing devices may be organized in a standalone fashion, in cloud-based (networked) computing environments, or in other arrangements.

Figure 2:
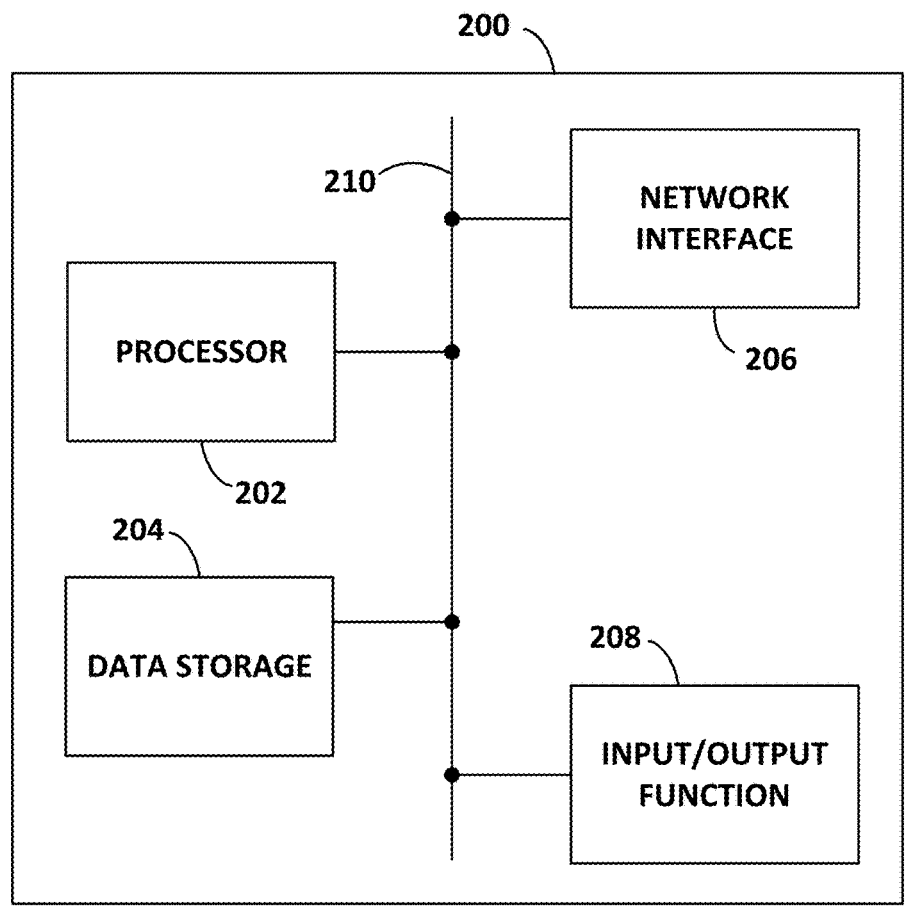
FIG. 2 illustrates a schematic drawing of a computing device, according to an example embodiment.

FIG. 2 is a simplified block diagram exemplifying a computing device 200, illustrating some of the components that could be included in a computing device arranged to operate in accordance with the embodiments herein. Example computing device 200 could be a client device, a server device, or some other type of computational platform. For purpose of simplicity, this specification may equate computing device 200 to a server from time to time. Nonetheless, the description of computing device 200 could apply to any component used for the purposes described herein.

In this example, computing device 200 includes a processor 202, a data storage 204, a network interface 206, and an input/output function 208, all of which may be coupled by a system bus 210 or a similar mechanism. Processor 202 can include one or more CPUs, such as one or more general purpose processors and/or one or more dedicated processors (e.g., application specific integrated circuits (ASICs), digital signal processors (DSPs), network processors, etc.).

Data storage 204, in turn, may comprise volatile and/or non-volatile data storage and can be integrated in whole or in part with processor 202. Data storage 204 can hold program instructions, executable by processor 202, and data that may be manipulated by these instructions to carry out the various methods, processes, or operations described herein. Alternatively, these methods, processes, or operations can be defined by hardware, firmware, and/or any combination of hardware, firmware and software.

By way of example, the data in data storage 204 may contain program instructions, perhaps stored on a non-transitory, computer-readable medium, executable by processor 202 to carry out any of the methods, processes, or operations disclosed in this specification or the accompanying drawings. Data storage 204 may also contain one or more playlists and/or audio files possibly referred to by playlists.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with example computing device 200. Input/output function 208 may comprise multiple types of input devices, such as a keyboard, a mouse, a touch screen, and so on. Similarly, input/output function 208 may comprise multiple types of output devices, such as a screen, monitor, printer, or one or more light emitting diodes (LEDs). Additionally or alternatively, example computing device 200 may support remote access from another device, via network interface 206 or via another interface (not shown), such as a universal serial bus (USB) or high-definition multimedia interface (HDMI) port.

In some embodiments, one or more computing devices may be deployed in a networked architecture. The exact physical location, connectivity, and configuration of the computing devices may be unknown and/or unimportant to client devices. Accordingly, the computing devices may be referred to as "cloud-based" devices that may be housed at various remote locations.

Figure 3:
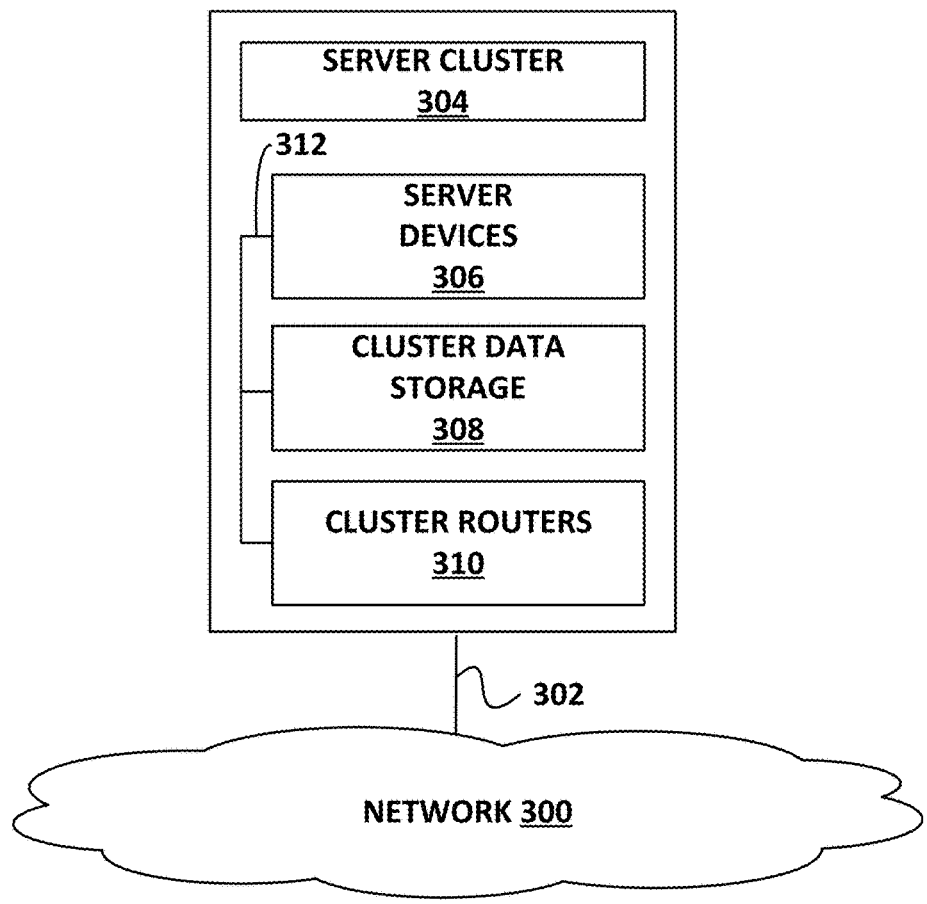
FIG. 3 illustrates a schematic drawing of a networked server cluster, according to an example embodiment.

FIG. 3 depicts a cloud-based server cluster 304 in accordance with an example embodiment. In FIG. 3, functions of a server device, such as server device 104 (as exemplified by computing device 200) may be distributed between server devices 306, cluster data storage 308, and cluster routers 310, all of which may be connected by local cluster network 312. The number of server devices, cluster data storages, and cluster routers in server cluster 304 may depend on the computing task(s) and/or applications assigned to server cluster 304.

For example, server devices 306 can be configured to perform various computing tasks of computing device 200. Thus, computing tasks can be distributed among one or more of server devices 306. To the extent that these computing tasks can be performed in parallel, such a distribution of tasks may reduce the total time to complete these tasks and return a result. For purpose of simplicity, both server cluster 304 and individual server devices 306 may be referred to as "a server device." This nomenclature should be understood to imply that one or more distinct server devices, data storage devices, and cluster routers may be involved in server device operations.

Cluster data storage 308 may be data storage arrays that include disk array controllers configured to manage read and write access to groups of disk drives (e.g., hard drives with rotating platters or solid state drives). The disk array controllers, alone or in conjunction with server devices 306, may also be configured to manage backup or redundant copies of the data stored in cluster data storage 308 to protect against disk drive failures or other types of failures that prevent one or more of server devices 306 from accessing units of cluster data storage 308. As an example, cluster data storage 308 may contain one or more playlists and/or audio files possibly referred to by playlists.

Cluster routers 310 may include networking equipment configured to provide internal and external communications for the server clusters. For example, cluster routers 310 may include one or more packet-switching and/or routing devices configured to provide (i) network communications between server devices 306 and cluster data storage 308 via cluster network 312, and/or (ii) network communications between the server cluster 304 and other devices via communication link 302 to network 300.

Additionally, the configuration of cluster routers 310 can be based at least in part on the data communication requirements of server devices 306 and cluster data storage 308, the latency and throughput of the local cluster networks 312, the latency, throughput, and cost of communication link 302, and/or other factors that may contribute to the cost, speed, fault-tolerance, resiliency, efficiency and/or other design goals of the system architecture.

As a possible example, cluster data storage 308 may include any form of database, such as a structured query language (SQL) database. Various types of data structures may store the information in such a database, including but not limited to tables, arrays, lists, trees, and tuples. Furthermore, any databases in cluster data storage 308 may be monolithic or distributed across multiple physical devices.

Server devices 306 may be configured to transmit data to and receive data from cluster data storage 308. This transmission and retrieval may take the form of SQL queries or other types of database queries, and the output of such queries, respectively. Additional text, images, video, and/or audio may be included as well. Furthermore, server devices 306 may organize the received data into web page representations. Such a representation may take the form of a markup language, such as the hypertext markup language (HTML), the extensible markup language (XML), or some other standardized or proprietary format. Moreover, server devices 306 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages and media files to client devices, as well as client device interaction with the web pages and media files.

Figure 4A:
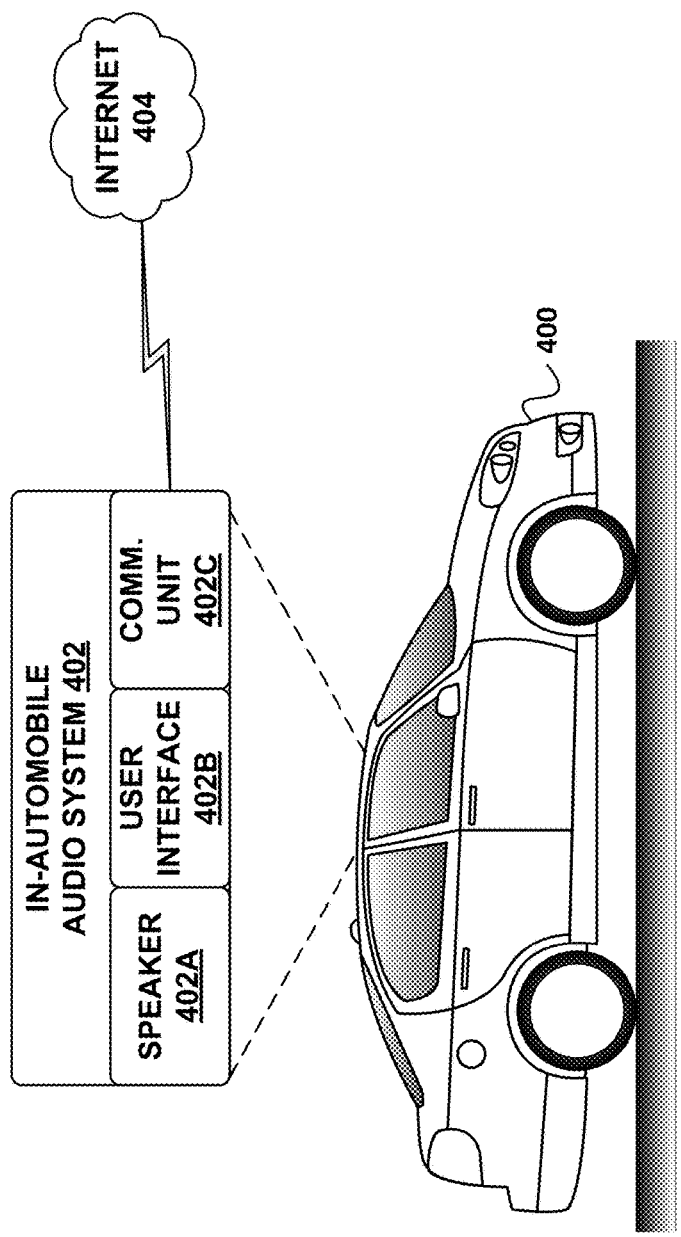
FIG. 4A depicts components of an in-automobile audio system, according to an example embodiment.
Figure 4B:
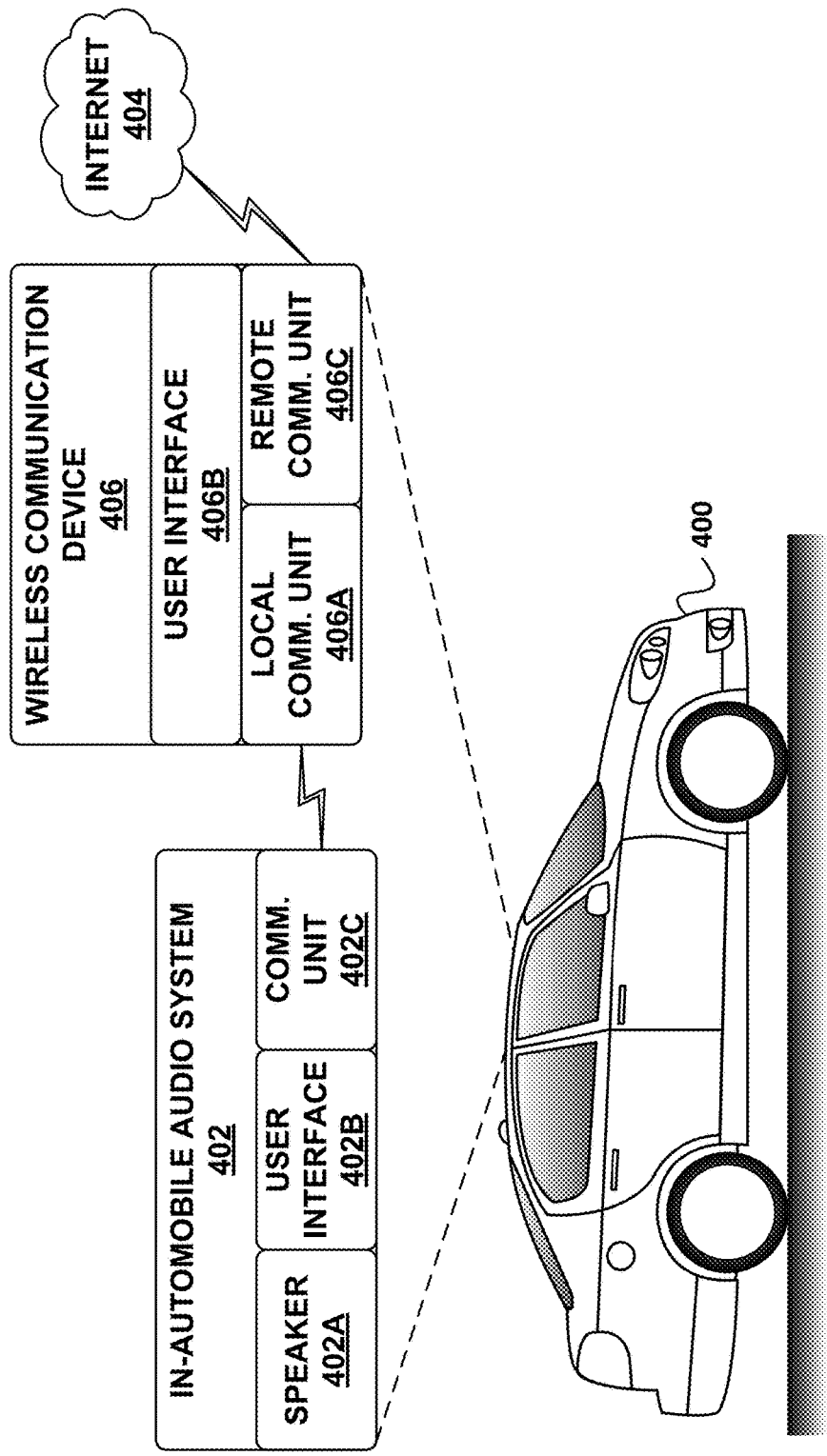
FIG. 4B depicts components of an in-automobile audio system interacting with a wireless communication device, according to an example embodiment.

Some of the embodiments herein may involve playout of audio files (streamed or downloaded) by way of an in-automobile audio system. FIGS. 4A and 4B depict examples of such an arrangement.

FIG. 4A includes automobile 400 equipped with in-automobile audio system 402. The latter contains one or more instances of a speaker 402A, a user interface 402B, and a communication unit 402C. In-automobile audio system 402 may include additional components not depicted in FIG. 4A, such as processors, memory, decoders, and so on.

Speaker 402A may include any mechanism for converting digital signals into audio output. User interface 402B may include, for instance, a touchscreen through which in-automobile audio system 402 can be controlled. Communication unit 402C may include one or more wireless communication interfaces through which in-automobile audio system 402 can communicate with a packet-switched network, of which Internet 404 is an example.

In the embodiment of FIG. 4A, in-automobile audio system 402 may request and receive, by way of communication unit 402C, streams or downloads of audio files from Internet 404. In-automobile audio system 402 may play out these audio files through speaker 402A. User interface 402B may be used to set up, modify, or terminate such a configuration.

FIG. 4B also includes automobile 400 equipped with in-automobile audio system 402. But, in this depiction, communication unit 402C of in-automobile audio system 402 communicates with local communication unit 406A of wireless communication device 406. Remote communication unit 406C of wireless communication device 406, in turn, communicates with Internet 404. Wireless communication device 406 may be, for example, a smartphone, tablet, or another type of network-enabled portable computer.

The link between communication unit 402C and local communication unit 406A may be either wired or wireless. For instance, this link may be a USB cable connecting communication unit 402C and local communication unit 406A or a BLUETOOTH® association between these units.

In some embodiments, in-automobile audio system 402 may be configured (perhaps by way of user interface 402B) to play out audio provided to it by wireless communication device 406. Wireless communication device 406 may be configured (perhaps by way of user interface 406B) to download or stream audio files by way of Internet 404. Thus, streaming audio may be transmitted by a server device (e.g., server cluster 304) accessible via Internet 404, received by wireless communication device 406, and relayed or retransmitted to in-automobile audio system 402.

In some cases, the audio files may stream between such a server device and wireless communication device 406, with wireless communication device 406 providing digital audio output to in-automobile audio system 402. In other cases, wireless communication device 406 may download one or more audio files from the server device, then stream these files to in-automobile audio system 402 for playout. Other arrangements may exist.

3. Example Playlist and Streaming Environment

Once audio files are selected, the client device may generate or be provided with a playlist of these audio files. With such a playlist, the client device may be able to request streams of the audio files and play out these streams.

Figure 5A:
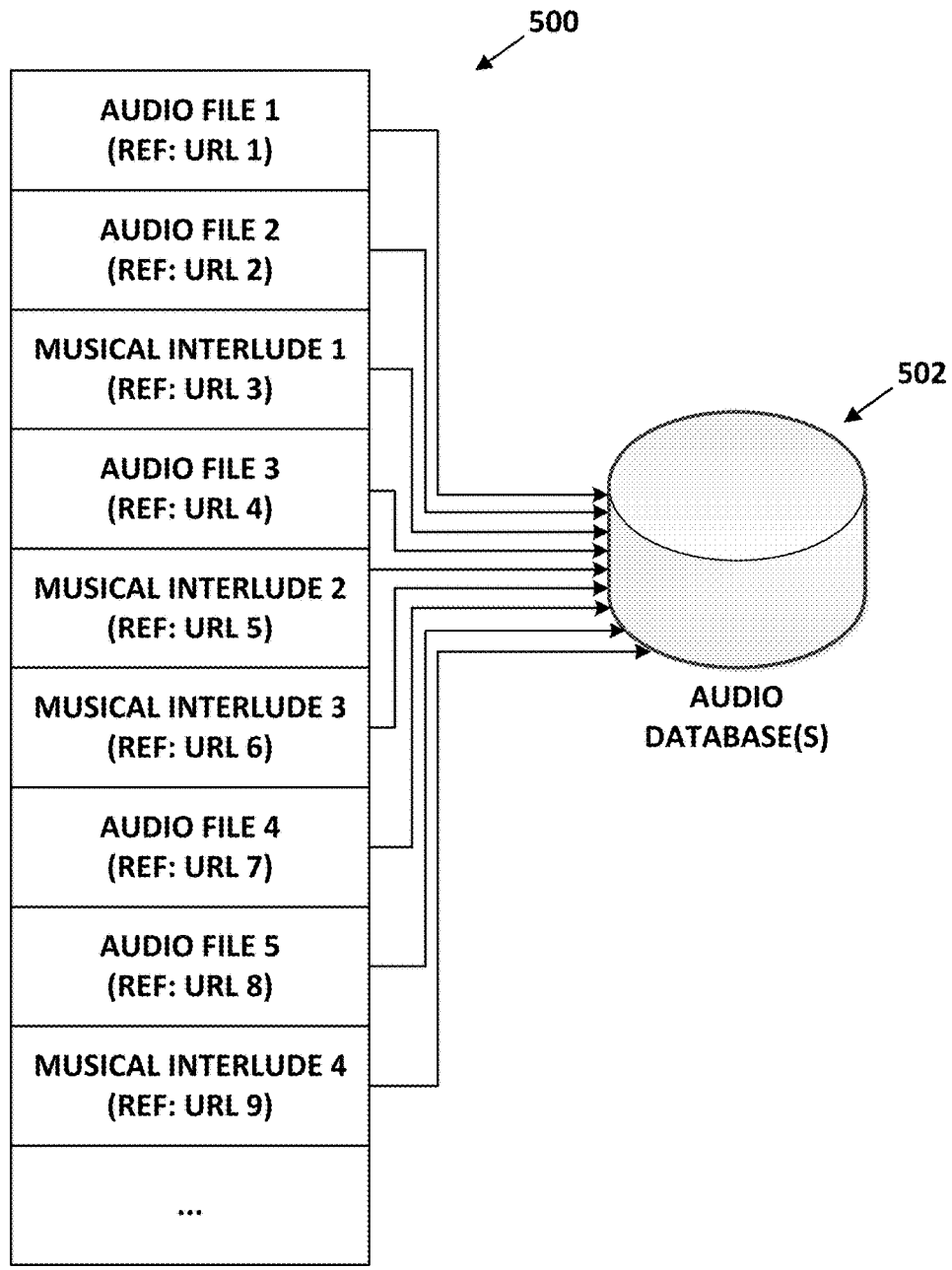
FIG. 5A depicts a playlist, according to an example embodiment.

FIG. 5A depicts an example playlist 500, which contains a sequence of references to audio files. Playlist 500 may take the form of a computer file, such as a plain text file, an XML file, an HTML file, a binary file, or some other file format. Playlists may take other forms as well, and may contain other types of content. Each entry in playlist 500 may include an identifier of an audio file and/or a reference to the audio file. Audio files referred to in playlist 500 may be stored in audio database(s) 502.

In addition to the audio files selected by a user, database(s) 502 may include other audio files that contain musical interludes. In generated playlists, zero or more musical interludes may be placed between each pair of audio files. The musical interludes may be short piece of music that may serve as a break between audio files. For instance, when the playlist contains at least some spoken word audio (e.g., news, sports, weather), musical interludes therebetween signal a change of topic to the user. Musical interludes are optional and need not appear in a playlist.

Nonetheless, the referenced audio file 1 in playlist 500 contains a URL that points to the location of the audio file for article 1, while the referenced musical interlude 1 in playlist 500 contains a URL that points to the location of the audio file for musical interlude 1, and so on. Nonetheless, playlists may take other forms, such as sequences of files.

In general, audio database(s) 502 may contains hundreds, thousands, tens of thousands, or even more audio files. Thus, audio database(s) 502 may represent one or more physical devices that store these files. Such physical devices may be located in the same physical location, or may be distributed over a communication network (e.g., the Internet). In some cases, the audio files may be obtained via a third-party file download or streaming service.

Playlist 500 contains references to five audio files that are roughly interleaved with references to four musical interludes. A playlist may contain more or fewer entries, however. Additionally, the patterns of audio files and musical interludes may vary. In some cases, a playlist may predominately contain references to audio files with few references to musical interludes, and in other cases a playlist may predominately contain references to musical interludes with few references to audio files. As noted above, the musical interludes may exist as audio files that are separate from the audio files selected by the user.

Figure 5B:
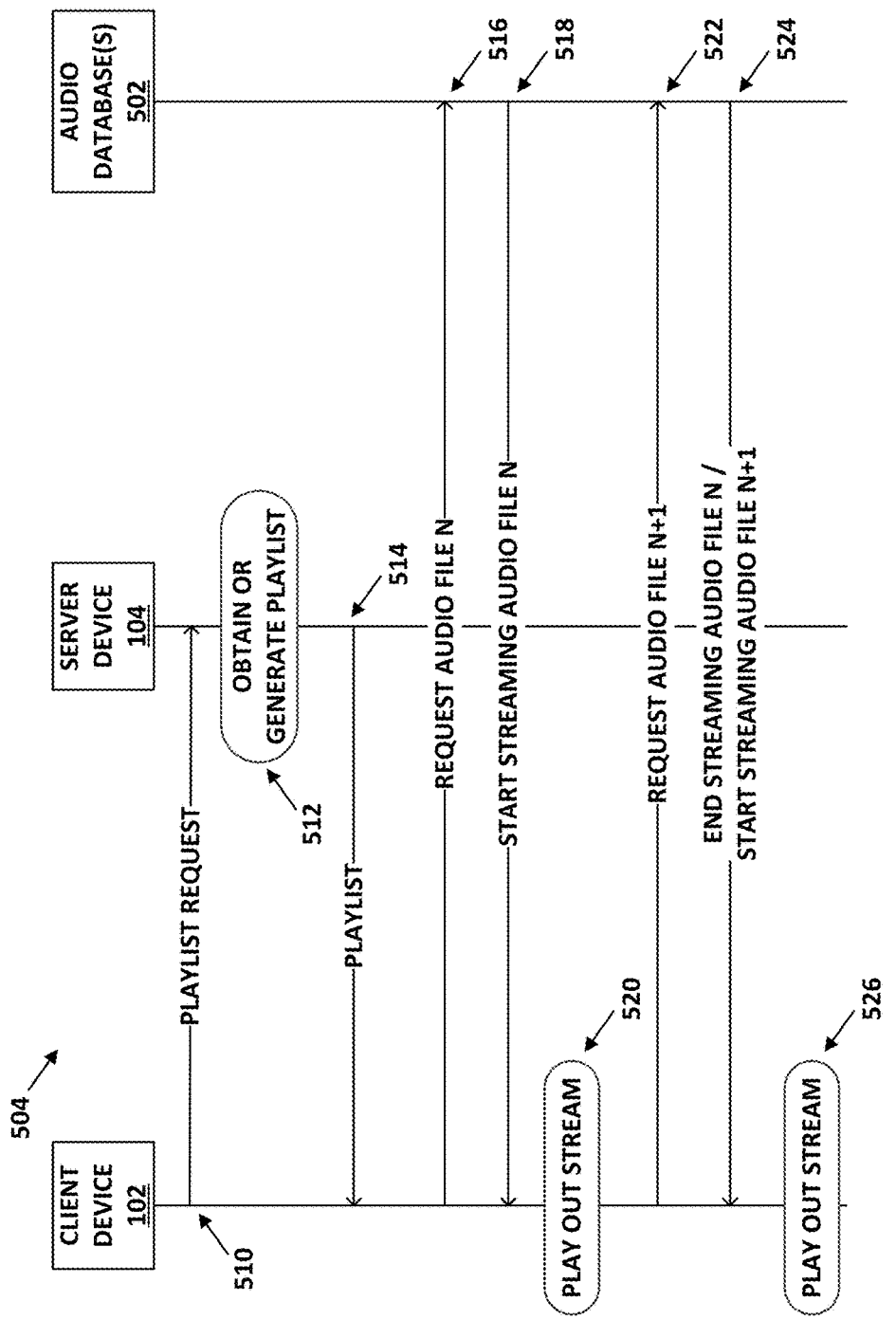
FIG. 5B is a message flow diagram depicting distribution of a playlist, as well as distribution and playout of audio files referenced by the playlist, according to an example embodiment.

FIG. 5B is a message flow diagram 504 depicting an example distribution of a playlist. Message flow diagram 504 includes client device 102, server device 104, and audio database(s) 502. In some embodiments, one or more of server device 104 and audio database(s) 502 may be combined into fewer components or divided into more components. For instance, server device 104 may contain the functionality of audio database(s) 502. Other arrangements are possible.

Client device 102 may include an audio player application that can request playlists, load playlists, parse playlists, and/or request streams of audio files referenced in playlists. In some embodiments, the audio player application may be triggered to begin requesting and streaming the audio files by reception of a playlist.

At step 510, client device 102 may transmit a playlist request to server device 104. Here, it is assumed that server device 104, or some other device, has generated a playlist based on one or more audio files to be streamed to client device 102, or has the ability to generate or otherwise obtain the playlist if the playlist is not immediately available. Thus, at step 512, server device 104 may generate or obtain the playlist. At step 514, server device 104 may transmit a representation of the playlist to client device 102. As was discussed in the context of FIG. 5A, the playlist may include a sequence of references to audio files stored in audio database(s) 502.

At step 516, client device 102 may transmit, to audio database(s) 502, a request for the nth entry of the playlist. For instance, client device 102 may parse the playlist, determine the URL of the nth entry, and request the content at that URL from audio database(s) 502. In response, at step 518, audio database(s) 502 may start transmitting, to client device 102, a stream of the audio file associated with this entry. Then, at step 520, client device 102 may play out the stream.

Notably, client device 102 may receive and buffer a portion of the stream (e.g., 5-10 seconds) before beginning playout of the stream. In this way, if there is jitter in the delivery of subsequent portions of the stream to client device 102, this jitter may be hidden from the user by the buffering of the stream. Client device 102 may seek to maintain such buffering through playout of all audio files.

At step 522, client device 102 may transmit, to audio database(s) 502, a request for the (n+1)th entry of the playlist. Client device 102 may transmit this request while still playing out a portion of the audio file associated with the nth entry. In this manner, client device 102 may be able to transition smoothly from playout of the audio file associated with the nth entry to playout of the audio file associated with the (n+1)th entry. For instance, the audio player application may fade out the end of the audio file associated with the nth entry while fading in the beginning of the audio file associated with the (n+1)th entry.

Regardless, at step 524, audio database(s) 502 may start transmitting, to client device 102, a stream of the audio file associated with the (n+1)th entry. The beginning of this stream may coincide with (e.g., directly follow) the end of the streaming of the audio file associated with the nth entry. Or, the streaming of these two audio files may overlap to some extent. Then, at step 526, client device 102 may play out the stream.

FIGS. 5A and 5B are just example embodiments of playlist generation and audio file streaming. Other embodiments may be used to achieve the same or similar outcomes.

4. Example Operations

Figure 6A:
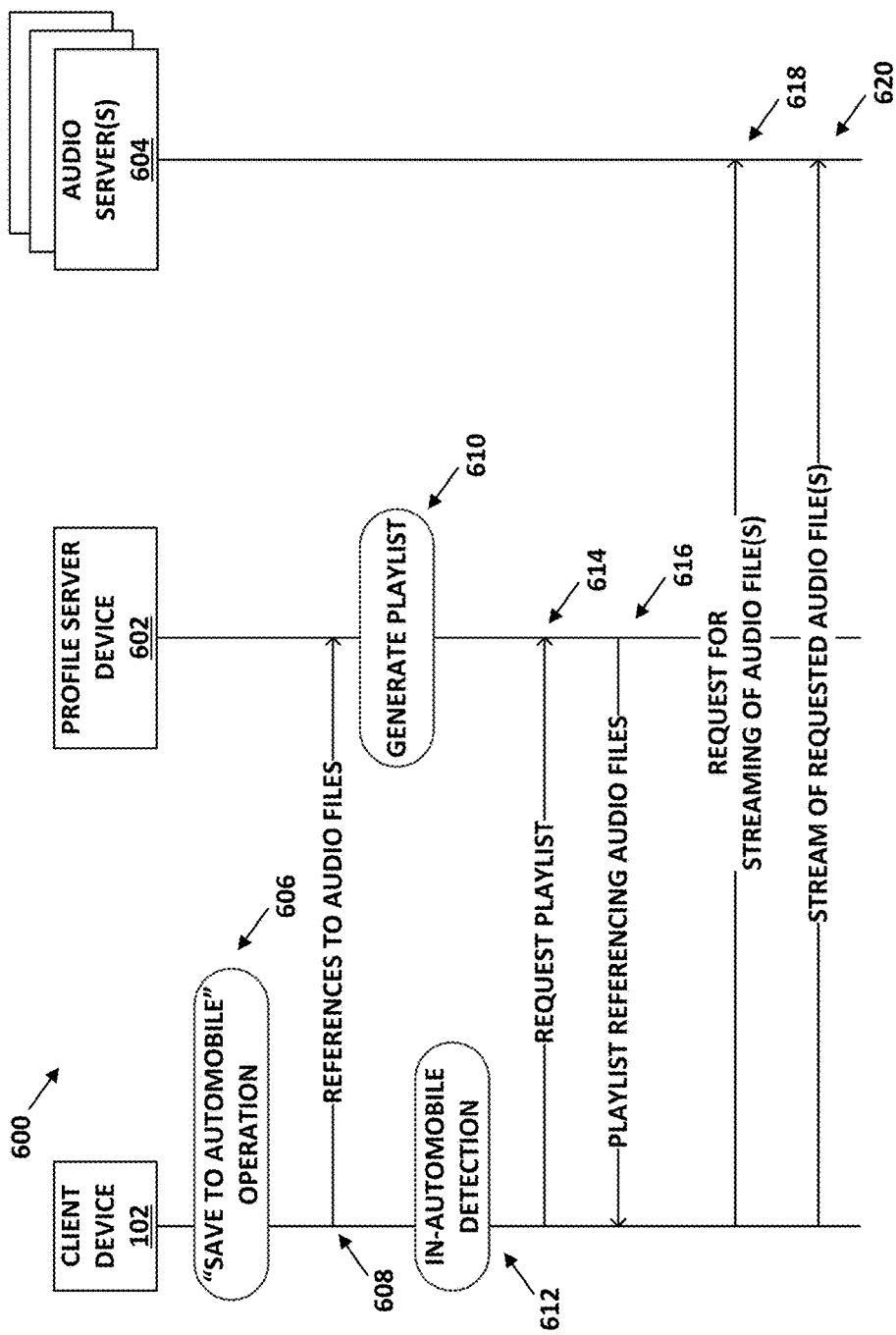
FIG. 6A is a message flow diagram depicting streaming of selected audio files to a client device in an automobile, according to an example embodiment.

FIGS. 6A and 6B depict message flow diagrams in accordance with example embodiments. Message flow diagram 600 of FIG. 6A depicts in-automobile detection by a client device, and subsequent streaming of pre-selected audio files to that client device. The transaction therein involves client device 102, profile server device 602, and one or more audio servers 604.

At step 606, a user may instruct client device 102 to perform one or more "save to automobile" operations. Each such operation triggers client device 102 to save text, links, or other data related to one or more audio files that can be streamed at a later time. For instance, the user might be browsing web sites by way of a web browser. The web browser may have a user interface function (e.g., a button or another type of selector) that acts to store a reference to stream-able audio content on a web site. By activating this function, the reference may be stored locally on client device 102. Other applications, such as media players, email applications, social media applications, and/or games may have similar "save to automobile" abilities.

At step 608, one or more references saved in this fashion may be transmitted to profile server device 602. Profile server device 602 may be a remote server (e.g., a cloud-based server) that has access to a user profile associated with client device 102. Among other things, profile server device 602 may store information related to a user of client device 102, including a list of one or more references to audio files that were generated from use of a "save to automobile" operation.

At step 610, profile server device 602 may generate a playlist including at least some of the one or more references transmitted at step 608. This playlist may include, for instance, an ordering of URLs that reference audio files.

At step 612, which may take place seconds, minutes, hours, or days after step 610, client device 102 may detect that it is in an automobile. This detection may take place in numerous ways. In some examples, client device 102 may be plugged in to (e.g., via a USB cable), or otherwise associated with (e.g., via BLUETOOTH®), an automobile. In some examples, client device 102 may detect that it is within range of a wireless signal associated with an automobile, such as a wireless access point (e.g., Wi-Fi). In these cases, the automobile might identify itself over such an interface and/or the interface may be previously associated with the automobile (e.g., via settings in the client device 102), and client device 102 may thereby determine that it is in the automobile.

Alternatively, client device 102 may make such a determination indirectly. For instance, client device 102 may be equipped with a location determining module, such as a global positioning system (GPS) unit. By taking two or more measurements via this module, client device 102 may be able to estimate a speed at which it is moving. If this speed exceeds a particular speed threshold (e.g., 20-30 miles per hour) for a particular time threshold (e.g., 10-20 seconds or more), client device 102 may determine that it is in an automobile. In some embodiments, this determination may be assisted by map data stored on or accessible to client device 102. This map data may include locations of roads and highways. Then, client device 102 may make a more accurate in-automobile determination by considering whether the speed of client device 102 is sufficiently high, as well as whether client device has been travelling on roads or highways. In this fashion, client device 102 may be able to differentiate between being in an automobile versus being carried by an individual who is walking or riding a bike.

In-automobile detection on a client device may be assisted by an application programming interface (API) that allows applications operating on the client device to query the operating system or a library of the client device as to whether the client device is in an automobile. The operating system or library might carry out any of the actions described above to detect whether the client device is in an automobile and then provide a response to the application. Alternatively, manual setting of client device 102 to an "in-automobile" mode may be possible.

At step 614, which may be performed in response to the in-automobile detection of step 612, client device 102 may request a playlist from profile server device 602. At step 616, profile server device 602 may responsively transmit a copy of the playlist to client device 102. The playlist may contain references to the audio files.

At step 618, client device 102 may transmit a request to audio server(s) 604 for the streaming of the audio files. At step 620, audio server(s) 604 may begin transmitting the stream of one of the requested audio files to client device 102. After receiving at least a portion of this stream, client device 102 may buffer and then audibly play out the stream.

In some embodiments, steps 618 and 620 may include one or more additional sub-steps in accordance with the streaming shown in message flow diagram 504. For instance, client device 102 may sequentially request the stream of multiple audio files from two or more of audio server(s) 604.

The ordering of the steps in FIG. 6A is for purpose of example, and other orderings exist. For instance, step 610 may occur in response to step 614—that is, profile server device 602 may generate a playlist in response to receiving a request for such a playlist. In other embodiments, steps 614 and 616 may take place prior to step 612. In other words, profile server device 602 may generate and transmit the playlist to client device 102 before client device 102 detects that it is in an automobile. In such an embodiment, step 614 might not be necessary, as profile server device 602 may automatically transmit the playlist to client device 102 after the playlist is generated. Further, any of steps 606, 608, 610, 614, and 616 may occur multiple times, with profile server device 602 adding one or more references to the playlist each time.

Additionally, and not shown in FIG. 6A, client device 102 may transmit an indication to profile server device 602 after playing out one or more audio files. This indication may specify the references of one or more audio files that have been played out, so that profile server device 602 can remove these files from the playlist. Alternatively, client device 102 may update its copy of the playlist by removing these references, and transmit the updated playlist to profile server device 602.

Message flow diagram 630 of FIG. 6B depicts in-automobile detection by an automobile and subsequent streaming of pre-selected audio files to an in-automobile audio system. The transaction involves client device 102, automobile 632, profile server device 602, and one or more audio servers 604.

At step 634, a user may instruct client device 102 to perform one or more "save to automobile" operations. These operations may take place as described in the context of step 606.

At step 636, one or more references saved in this fashion may be transmitted to profile server device 602. These operations may take place as described in the context of step 608.

At step 638, profile server device 602 may generate a playlist including at least some of the one or more references transmitted at step 636. These operations may take place as described in the context of step 610.

At step 640, automobile 632 detects that is has been activated (e.g., by turning the ignition switch or powering on or powering up the automobile or in-automobile audio system in some fashion). Possibly in response, at step 642, automobile 632 may request a playlist from profile server device 602. At step 644, profile server device 602 may responsively transmit a copy of the playlist to automobile 632. The playlist may contain references to the audio files. Alternatively, client device 102 may provide the references to the audio files or the playlist directly to automobile 632 (e.g., via USB or BLUETOOTH®), thus eliminating steps involving profile server device 602.

In some cases, automobile 632 may be associated with multiple user profiles (e.g., automobile 632 may have two or more drivers, and each driver may have a respective user profile accessible by profile server device 602). As such, in addition to detecting that it has been activated, automobile 632 may also determine which particular user of the multiple users has activated automobile 632. Such determination could be made on the basis of determining which one of multiple key fobs was used to initiate activation of the automobile 632 (e.g., each one of multiple key fobs may be associated with a respective user); on the basis of an estimated weight of the driver (e.g., separate driver profiles may each be associated with a respective driver weight, and pressure sensor(s) in the driver seat may be used to estimate the weight of the driver and the estimated weight may be associated with a respective user); on the basis of a position of the driver seat (e.g., separate driver profiles may each be associated with a respective driver seat position, and positions corresponding to those position profiles, within some tolerance, may be associated with a respective user); and/or on the basis of the presence of client device 102 within automobile 632 (e.g., different users may be associated with respective client devices, and the presence of a given client device within automobile 632 as detected via wireless signals, for example, may be associated with a respective user). In some cases, automobile 632 may provide a prompt to request a user input to select from amongst the multiple user profiles associated with automobile 632 (e.g., via a touch screen interface and/or voice interface). Moreover, indications of such user-distinguishing information may be transmitted to profile server device 602 along with the request for a playlist (step 642), to allow profile server device 602 to determine which user profile to access and send its corresponding playlist back to automobile 632 (step 644).

At step 646, automobile 632 may transmit a request to audio server(s) 604 for the streaming of the audio files. At step 648, audio server(s) 604 may begin transmitting the stream of one of the requested audio files to automobile 632. After receiving at least a portion of this stream, automobile 632 may buffer and then audibly play out the stream.

In some embodiments, steps 646 and 648 may include one or more additional sub-steps in accordance with the streaming shown in message flow diagram 504. For instance, automobile 632 may sequentially request the stream of multiple audio files from two or more of audio server(s) 604.

The ordering of the steps in FIG. 6B is for purpose of example and other orderings exist. For instance, step 638 may occur in response to step 642—that is, profile server device 602 may generate a playlist in response to receiving a request for such a playlist.

Figure 7:
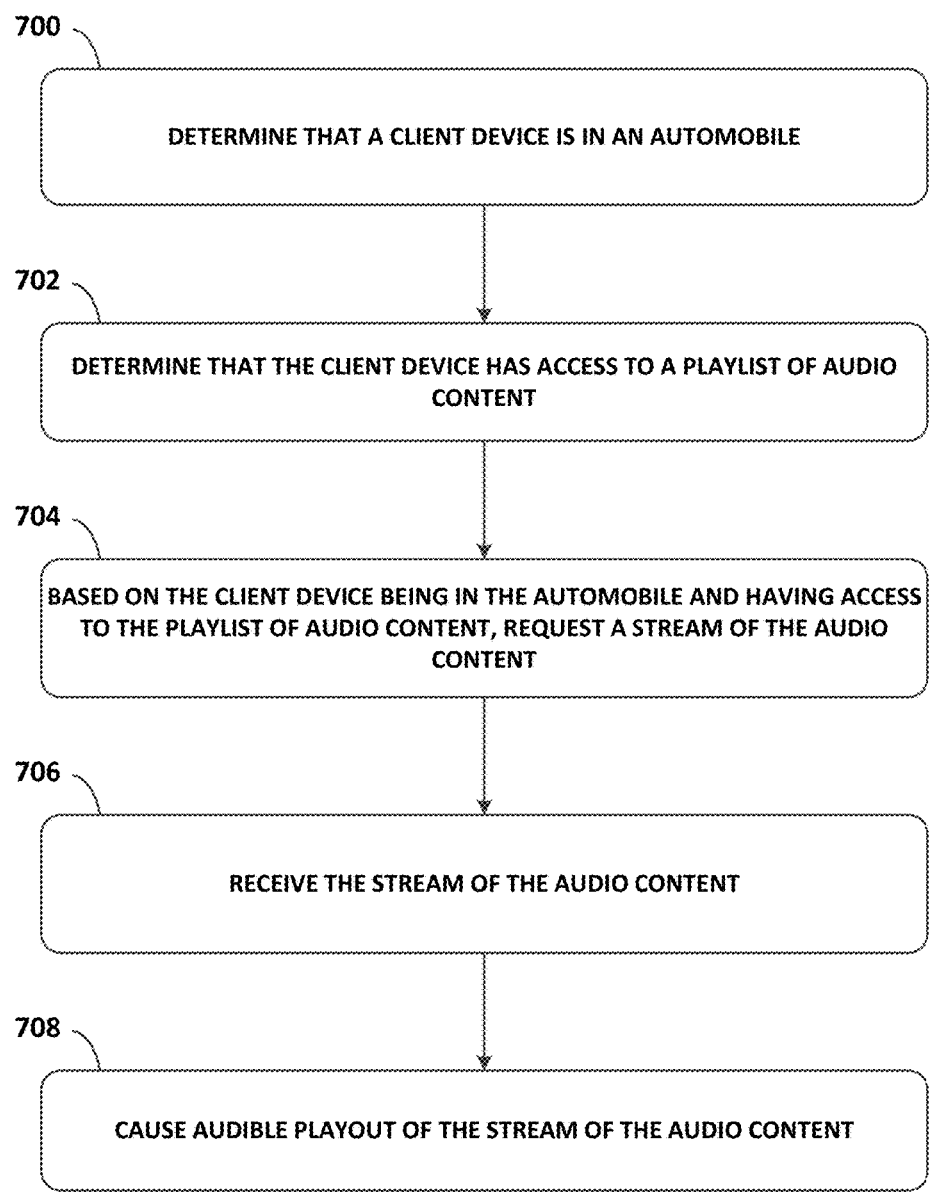
FIG. 7 is a flow chart, according to an example embodiment.

FIG. 7 is a flow chart illustrating an example embodiment. The process illustrated by FIG. 7 may be carried out by a client device, such as computing device 102. However, the process can be carried out by other types of devices or device subsystems, such as an automobile or an in-automobile audio system.

The embodiments of FIG. 7 may be simplified by the removal of any one or more of the features shown therein. Further, these embodiments may be combined with one another, as well as features, aspects, and/or implementations of any of the previous figures or otherwise described herein. Particularly, aspects of these embodiments may be described in more detail in the preceding specification.

A. Determining that a Client Device is in an Automobile

Block 700 may involve determining that a client device is in an automobile. Doing so may include (i) querying, by an application executing on the client device, an interface that provides whether the client device is estimated to be in the automobile, and (ii) receiving, by the application and via the interface, an indication that the client device is estimated to be in the automobile. Alternatively, the client device may make this determination based on its speed and/or location, as determined by a location determining module, and/or based on receiving wireless signals associated with the automobile.

B. Determining that the Client Device has Access to a Playlist of Audio Content

Block 702 may involve determining that the client device has access to a playlist of audio content. The audio content may be one or more audio files.

Doing so may involve determining that the client device previously flagged the audio content for in-automobile playout. Some embodiments may further involve determining weather or traffic conditions within a threshold distance of the client device, and selecting the audio content to include information regarding the determined weather or traffic conditions. For instance, if there is a storm within 20-30 miles of the automobile, a reference to an audio file announcing the existence and/or trajectory of this storm may be inserted into the playlist. In this manner, the user is warned of a potential upcoming driving impediment. If there is a traffic condition (e.g., an accident or congestion) within 5-10 miles of the automobile and in the direction that the automobile is heading, a reference to an audio file announcing the existence and/or location of this condition may be inserted into the playlist. In this fashion, the user may be able to plot an alternate route to avoid the condition.

Alternatively or additionally, embodiments may also involve determining a number of humans in the automobile, and selecting the audio content based on the determined number of humans in the automobile. For instance, some automobiles include pressure sensors in one or more of the seats therein. Through use of the pressure sensors, the number of human in the automobile can be determined, and then provided to the client device. Based on this determination, the audio content streamed to the client device may change. For example, if there is one person in the automobile, a default playlist may be used. But, if there is more than one person in the automobile, a different playlist may be used, or the playlist may be modified to include different references to different audio files.

C. Requesting a Stream of the Audio Content

Block 704 may involve, possibly based on the client device being in the automobile and having access to the playlist of audio content, requesting a stream of the audio content. Doing so may include providing a visual or audible indication that the client device can play out the audio content, and receiving a command to request the stream of audio content. In some embodiments, the command may be a voice command, and the client device may perform speech recognition to decode the voice command.

D. Receiving the Stream of the Audio Content

Block 706 may involve receiving the stream of the audio content. This streaming may occur in accordance with the embodiments of any of FIGS. 4A, 4B, 5B, 6A, and 6B.

E. Causing Audible Playout of the Stream of the Audio Content

Block 708 may involve causing audible playout of the stream of the audio content. In some embodiments, the client device may be a wireless communication device that is in communication with an audio playout system of the automobile. In these embodiments, causing audible playout of the stream of the audio content comprises may involve transmitting the audio content to the audio playout system, wherein reception of the audio content causes the audio playout system to play out the audio content. When the client device is a wireless communication device that includes a speaker, causing audible playout of the stream of the audio content may involve playing out the audio content by way of the speaker.

In alternative embodiments, the client device may be the automobile and the automobile may include an audio playout system. In these embodiments, causing audible playout of the stream of the audio content may involve providing the audio content to the audio playout system. Reception of the audio content may cause the audio playout system to play out the audio content.

5. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
    receiving, by a profile server device and from a client device, references to one or more audio files, wherein the references to the one or more audio files are provided as part of a save to automobile operation on the client device;
    storing, by the profile server device, the references to the one or more audio files in a profile of a user, and wherein the profile is associated with the client device;
    receiving, by the profile server device and from an automobile, a request for a playlist associated with the profile, wherein the user is associated with the automobile;
    generating, by the profile server device, a playlist containing the references to the one or more audio files that were provided as part of the save to automobile operation; and
    transmitting, by the profile server device and to the automobile, the playlist.

2. The computer-implemented method of claim 1, wherein generating the playlist occurs in response to receiving the request for the playlist.

3. The computer-implemented method of claim 1, wherein generating the playlist occurs before receiving the request for the playlist.

4. The computer-implemented method of claim 1, further comprising:
    receiving references to one or more further audio files, wherein the references to the one or more further audio files are provided as part of a further save to automobile operation; and
    adding, by the profile server device, the references to the one or more further audio files to the playlist.

5. The computer-implemented method of claim 1, wherein the save to automobile operation is triggered by the user on the client device.

6. The computer-implemented method of claim 1, further comprising:
    receiving, by the profile server device and from the automobile, an indication that an audio file of the one or more audio files has been played out by automobile; and
    removing, by the profile server device, the audio file from the playlist.

7. The computer-implemented method of claim 6, wherein receiving the indication that the audio file has been played out by automobile comprises receiving a copy of the playlist not including the audio file.

8. The computer-implemented method of claim 1, wherein the request identifies the profile of the user.

9. An article of manufacture including a non-transitory computer-readable medium, having stored thereon program instructions that, upon execution by a computing device, cause the computing device to perform operations comprising:
    receiving, from a client device, references to one or more audio files, wherein the references to the one or more audio files are provided as part of a save to automobile operation on the client device;
    storing the references to the one or more audio files in a profile of a user, and wherein the profile is associated with the client device;
    receiving, from an automobile, a request for a playlist associated with the profile, wherein the user is associated with the automobile;

generating a playlist containing the references to the one or more audio files that were provided as part of the save to automobile operation; and transmitting, to the automobile, the playlist.

10. The article of manufacture of claim 9, wherein generating the playlist occurs in response to receiving the request for the playlist.

11. The article of manufacture of claim 9, wherein generating the playlist occurs before receiving the request for the playlist.

12. The article of manufacture of claim 9, the operations further comprising:

receiving references to one or more further audio files, wherein the references to the one or more further audio files are provided as part of a further save to automobile operation; and adding the references to the one or more further audio files to the playlist.

13. The article of manufacture of claim 9, wherein the save to automobile operation is triggered by the user on the client device.

14. The article of manufacture of claim 9, wherein reception of the playlist by the automobile causes the automobile to use the references to retrieve and play out the one or more audio files.

15. The article of manufacture of claim 9, the operations further comprising:

receiving, from the automobile, an indication that an audio file of the one or more audio files has been played out by automobile; and removing the audio file from the playlist.

16. The article of manufacture of claim 15, wherein receiving the indication that the audio file has been played out by automobile comprises receiving a copy of the playlist not including the audio file.

17. The article of manufacture of claim 9, wherein the request identifies the profile of the user.

18. A computing device comprising:

a processor;

memory; and program instructions, stored in the memory, that upon execution by the processor cause the computing device to perform operations comprising:

receiving, from a client device, references to one or more audio files, wherein the references to the one or more audio files are provided as part of a save to automobile operation on the client device;

storing the references to the one or more audio files in a profile of a user, and wherein the profile is associated with the client device;

receiving, from an automobile, a request for a playlist associated with the profile, wherein the user is associated with the automobile;

generating a playlist containing the references to the one or more audio files that were provided as part of the save to automobile operation; and transmitting, to the automobile, the playlist.

19. The computing device of claim 18, the operations further comprising:

receiving, from the automobile, an indication that an audio file of the one or more audio files has been played out by automobile; and removing the audio file from the playlist.

20. The computing device of claim 19, wherein receiving the indication that the audio file has been played out by automobile comprises receiving a copy of the playlist not including the audio file.

* * * * *